J. WESTMORELAND.
CULTIVATOR.
APPLICATION FILED MAY 20, 1911.

1,088,757.

Patented Mar. 3, 1914.
2 SHEETS—SHEET 1.

Witnesses

J. Westmoreland
Inventor
by C. A. Snow & Co.
Attorneys

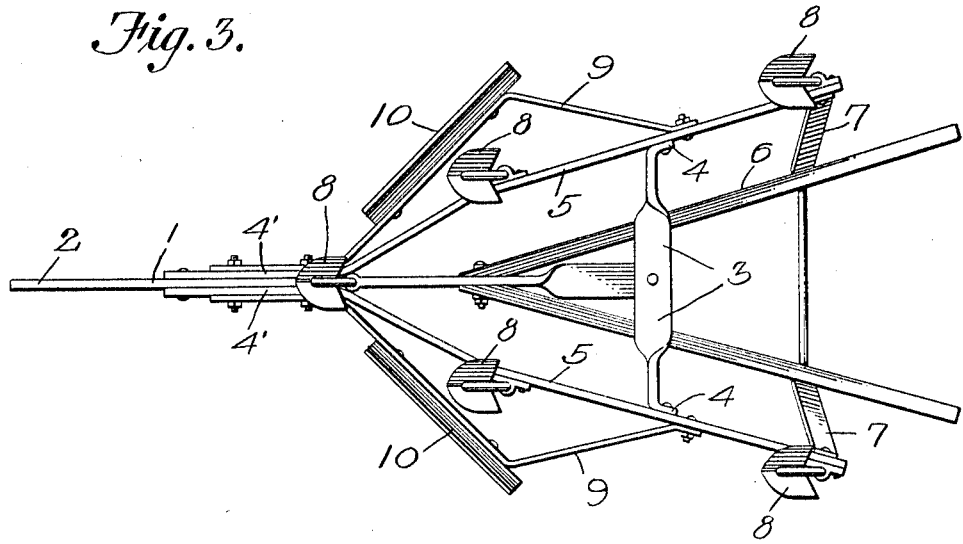
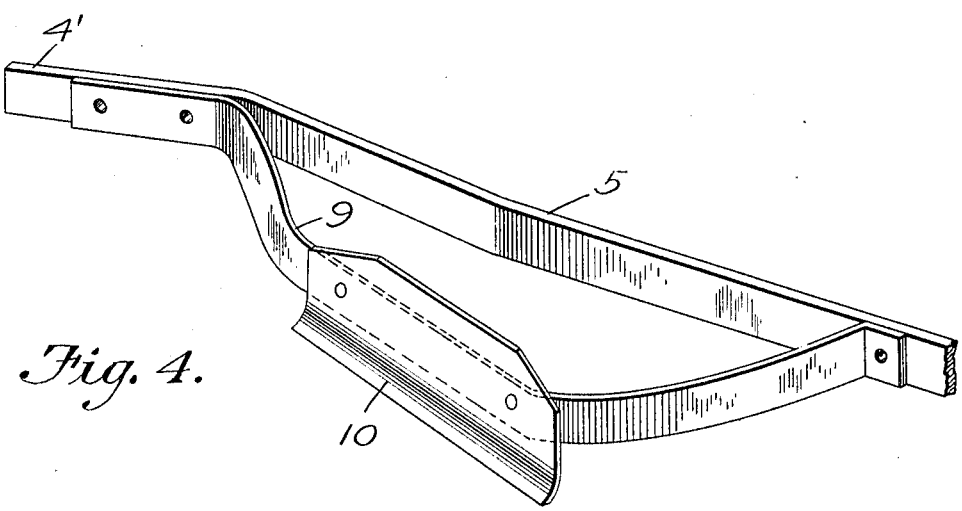

UNITED STATES PATENT OFFICE.

JEFFERSON WESTMORELAND, OF RANDOLPH, MISSISSIPPI.

CULTIVATOR.

1,088,757.  Specification of Letters Patent.  Patented Mar. 3, 1914.

Application filed May 20, 1911. Serial No. 628,481.

*To all whom it may concern:*

Be it known that I, JEFFERSON WESTMORELAND, a citizen of the United States, residing at Randolph, in the county of Pontotoc and State of Mississippi, have invented a new and useful Cultivator, of which the following is a specification.

This invention relates to an improvement in cultivators, the primary object of the invention being the provision of removable blades, which act as scrapers and are disposed to the side and front of the cultivator teeth or blades, the cultivator being adapted to be drawn by a single horse so that as the tooth or teeth act upon the ground the scraper will scrape and level off the top of the bed.

With the foregoing and other objects in view which will appear as the description proceeds the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
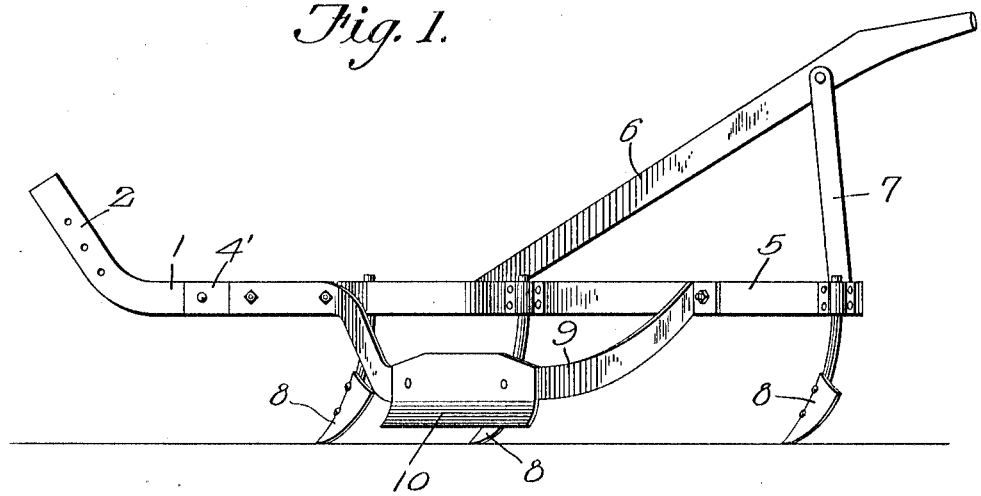
Figure 2:
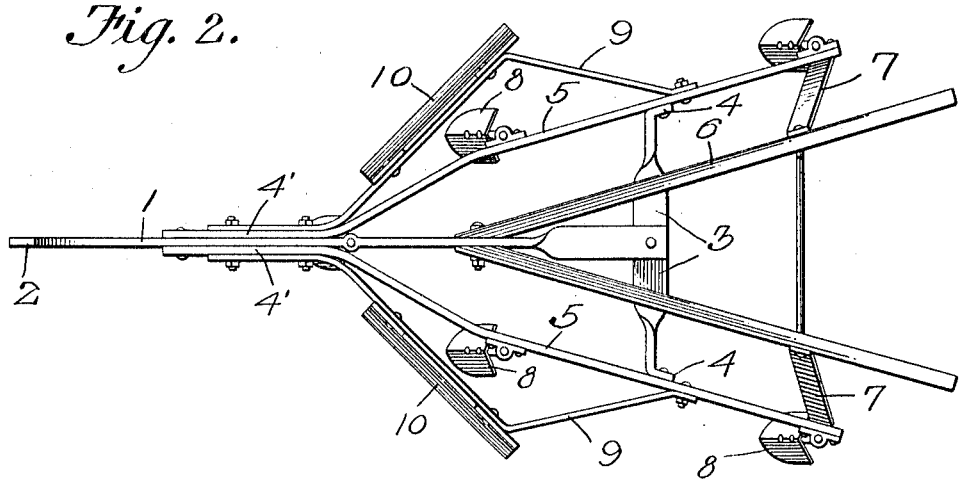

In the accompanying drawings—Figure 1 is a side elevation of my complete cultivator, the scraper blades being in operable position thereon. Fig. 2 is a top plan view thereof. Fig. 3 is a bottom plan view thereof. Fig. 4 is a detail view of one of the scrapers removed.

Referring to the drawings by characters of reference, 1 designates a central or main beam having an upwardly and forwardly extending front terminal portion 2 for engagement by a clevis while oppositely extending arms 3 are connected to the rear portion of the beam and have their rearwardly extended terminals riveted or otherwise secured to side strips 5. These strips converge forwardly and are bolted or otherwise secured to the sides of the beam 1, the front end portions of the strips being parallel, as indicated at 4' so as to fit snugly against the beam. Upwardly and rearwardly diverging handles 6 are secured at their forward ends to the beam 1 and are connected, adjacent their rear ends, to the rear ends of the strips 5, by means of braces 7 which diverge downwardly. Soil engaging devices 8 are connected to the strips 5 and may be of any preferred type. Secured to the outer face of each of the strips 5 is a bracket for connecting a scraper blade to the cultivator. Each bracket is in the form of a single strip of metal having its forward end portion bolted or otherwise secured upon one of the forward portions 4' of the adjacent strip 5 and from this forward terminal portion of the bracket, the said strip extends laterally and downwardly and merges into an upwardly and rearwardly extending portion bolted or otherwise to the strip 5. The bracket has been indicated generally at 9 and it will be noted that the downwardly and rearwardly extended front portion of the bracket has a scraper blade 10 bolted or otherwise secured to it. This blade is supported in a plane substantially vertical and the lower longitudinal edge of the blade is curved outwardly and is supported at a slight distance above the plane occupied by the lower ends of the soil engaging devices 8.

It will be seen that the two scraper blades converge forwardly and, therefore, when the cultivator is drawn forwardly, these blades will engage the soil and scrape it and shift the loosened soil laterally beyond the paths of the soil engaging devices 8. By referring particularly to Fig. 2 it will be seen that all of the soil engaging devices are located directly back of the scraping blades so that said devices only engage that portion of the soil over which the scraper blades have passed.

What is claimed is:

A cultivator including a central metallic beam, oppositely extending arms at the rear end of the beam, rearwardly diverging side strips secured at their front ends along the sides of the central beam and secured at intermediate points to the outer ends of the arms, a bracket angular in plan, one of these brackets being located at each side of the cultivator, the front end of each bracket being secured to the beam adjacent the front ends of the side strips and the rear end of each bracket being secured to the side strips adjacent the outer end of the arms, each of said brackets having its lower end curved upwardly from its center to constitute deflecting means, and rearwardly diverging scraping blades secured to the brackets and extending close to the central beam, a soil engaging device secured to the central beam between the forwardly converging portions of the brackets and slightly in advance of the front ends of the scraping blades, and soil engaging devices carried by the side strips and movable in the path cut by the scraping blades.

In testimony that I claim the foregoing as my own, I have hereto affixed my signature in the presence of two witnesses.

JEFF WESTMORELAND.

Witnesses:
W. J. LYON,
L. V. McGREYER.

Copies of this patent may be obtained for five cents each, by addressing the "Commissioner of Patents, Washington, D. C."